(12) United States Patent
Matsumoto et al.

(10) Patent No.: US 6,199,755 B1
(45) Date of Patent: Mar. 13, 2001

(54) MACHINE DATA ACQUISTION SYSTEM AND METHOD

(75) Inventors: Kenji Matsumoto, Yokohama; Shigeyuki Itoh, Zushi; Yutaka Takami, Yokohama; Masayuki Inoue, Fujisawa; Koichi Yoneta, Yokohama; Tetsuharu Inamitsu, Chigasaki, all of (JP)

(73) Assignees: Hitachi, Ltd., Tokyo (JP); Hitachi Video and Information System, Inc., Kanagawa-ken (JP)

( * ) Notice: Subject to any disclaimer, the term of this patent is extended or adjusted under 35 U.S.C. 154(b) by 0 days.

(21) Appl. No.: 09/078,971

(22) Filed: May 14, 1998

(30) Foreign Application Priority Data

Jun. 9, 1997 (JP) .................................... 9-150653

(51) Int. Cl.$^7$ ...................................... G06K 5/00
(52) U.S. Cl. .................... 235/380; 235/379; 235/437; 902/38
(58) Field of Search .................... 235/380, 437, 235/385, 379; 902/38, 39

(56) References Cited

U.S. PATENT DOCUMENTS

| | | | |
|---|---|---|---|
| 4,928,230 | * | 5/1990 | Kawamura et al. ................. 235/379 |
| 5,091,713 | * | 2/1992 | Horne et al. ........................ 340/541 |
| 5,253,167 | * | 10/1993 | Yoshida et al. ..................... 235/379 |
| 5,484,993 | * | 1/1996 | Seto et al. ........................... 235/437 |
| 5,520,275 | * | 5/1996 | Foglino ............................... 235/381 |
| 5,719,383 | * | 2/1998 | Forrest ................................ 235/379 |
| 6,006,275 | * | 12/1999 | Picazo, Jr. et al. ................. 709/249 |

FOREIGN PATENT DOCUMENTS

| | | |
|---|---|---|
| 775990 A2 | 5/1997 | (EP) . |
| 3-92966 | 4/1991 | (JP) . |
| 6-020117 | 1/1994 | (JP) . |
| WO96/17316 | 6/1996 | (WO) . |

* cited by examiner

Primary Examiner—Thien M. Le
Assistant Examiner—Daniel St. Cyr
(74) Attorney, Agent, or Firm—Mattingly, Stanger & Malur, P.C.

(57) ABSTRACT

A machine data acquisition system connected to a machine, for acquiring data on an internal status of the machine, and for use with an IC card having storage. The machine data acquisition system comprises an IC card accepting device which accepts the IC card, a machine data acquisition device which acquires data on the internal status of the connected machine, and a card writer which writes data acquired by the machine data acquisition device into the storage in the IC card.

53 Claims, 12 Drawing Sheets

FIG.2

| NO. | MACHINE NAME | SPECIFICATIONS | MODEL NO. | PRODUCT NO. | MACHINE STATUS |
|---|---|---|---|---|---|
| 1 | DISPLAY | 17-INCH MANUFACTURED BY *** | ABC-001 | 123456 | ***** |
| 2 | HDD | 1.5 GBYTES MANUFACTURED BY *** | A-AB111 | A112233 | ***** |
| 3 | FDD | 1.44 MB MANUFACTURED BY *** | 123-A1 | ABC1234 | ***** |
| ... | ... | ... | ... | ... | ... |

FIG.10

| NO. | MACHINE NAME | STORE NAME | PURCHASE DATE | GUARANTEE PERIOD | GUARANTEE NUMBER | REPAIR HISTORY |
|---|---|---|---|---|---|---|
| 1 | DISPLAY | **ELECTRIC CO. | 1996.4.10 | 1997.4.10 | 123456 | NOT REPAIRED |
| 2 | HDD | **RADIO CO. | 1996.4.10 | 1997.4.10 | 34567890 | NOT REPAIRED |
| 3 | FDD | **ELECTRIC CO. | 1996.4.10 | 1997.10.15 | ABC98765 | EXCHANGED, OCT. 15, 1996 |
| ... | ... | ... | ... | ... | ... | ... |

MACHINE DATA ACQUISTION SYSTEM AND METHOD

BACKGROUND OF THE INVENTION

1. Field of the Invention

The present invention relates to a system and a method which provide services such as repair charge estimation and software upgrading with the use of an IC card containing data on electronic money and on the internal status of machines including PCs and household electrical appliances.

2. Description of Related Art

When a personal computer or a household electrical appliance fails, the user normally takes it to an electrical appliances store or a manufacturer's service center to ask for an estimate of repair charges. In this case, the user must bring the failed computer or appliance to the store or the center himself, or ask a transportation company to transport it. This is very troublesome. In addition, as electrical appliances have become more and more sophisticated recently, it sometimes takes a long time to find the cause of a failure or to make an estimate of repair charges.

On the other hand, the introduction of an electronic purse system using an IC card, as described in Japanese Patent Publication Kokai JP-A No. Hei 3-92966, is now under study. This system utilizes an IC card which contains memory, into which information on a specified amount of money is stored. At the time of payment, the required amount data read from the IC card is transmitted, to complete a transaction without using money. The IC card used with this system can store not only electronic money data but various other types of data.

SUMMARY OF THE INVENTION

It is an object of the present invention to provide a labor-saving and time-saving system which uses an IC card containing sum (cash value) information for use in services such as an estimate of repair charges.

A machine data acquisition system according to the present invention is connected to a machine, is used to acquire data on the internal status of the machine, and is used with an IC card having storage. This machine data acquisition system comprises an IC card accepting module for accepting the IC card; a machine data acquisition module for acquiring data on the internal status of the connected machine; and an IC card writing module for writing the data on the internal status of the machine acquired by the machine data acquisition module into the storage in the IC card.

A machine according to the present invention is used with an IC card having storage. This machine comprises an IC card accepting module for accepting the IC card; a machine data acquisition module for acquiring data on the internal status of the machine; a writing module for writing the machine data acquired by the machine data acquisition module into the storage in the IC card; and a data sending module for sending data stored in the storage in the IC card over a communication line.

In the data acquisition system and the machine described above, machine-specific data may be stored previously in the storage in the IC card. This machine-specific data, as well as the acquired machine data, is sent over the communication line. Alternatively, only the machine-specific data may be sent. For example, the machine-specific data can be machine guarantee data (i.e., machine warranty data) or machine disposal information (e.g. disposal method, parts materials).

A machine data collection method of collecting data on the internal status of a machine according to the present invention comprises the steps of acquiring data on the internal status of the machine; recording the acquired data in an IC card; sending the machine status data over a communication line; and receiving the sent data.

A terminal according to the present invention is used with an IC card containing sum information and machine data. This terminal comprises an IC card accepting module for accepting the IC card; a data reading module for reading data stored on the IC card; and a data sending module for sending, over a communication line, data read by the data reading module.

An IC card according to the present invention is used with a machine whose internal status data is to be acquired. This IC card comprises sum information storage for storing sum information; and machine data storage for storing internal data on the machine. Another form of IC card according to the present invention comprises sum information storage for storing sum information; and disposal data storage for storing disposal data required when a machine is disposed of A data processing system according to the present invention is used with an IC card on which sum information and software information are recorded. This data processing system comprises a storage module for storing a software; an IC card accepting module for accepting the IC card; a data reading module for reading data from the IC card; a sending module for sending, over a communication line, the software information read by the data reading module; a receiving module for receiving charge information required for upgrading the software, the charge information being sent in response to the sent software information; and a sum information sending module for sending sum information from the IC card, the sum information corresponding to the received charge information.

A software upgrading method according to the present invention uses an IC card on which sum information and software information are recorded. This method first reads the software information and sends the read information over a communication line. Next, the method receives the information that was sent over a communication line and calculates a charge required for upgrading the software based on the received information. Next, the method sends the calculated charge information. Then, the method receives the charge information required for upgrading the software; and sends sum information from the IC card, the sum information corresponding to the received charge information.

BRIEF DESCRIPTION OF THE DRAWINGS

FIG. 2 shows an example of data stored in machine data storage.

FIG a flowchart showing an example of operation in which a personal computer accesses a service center.

Figure 7:
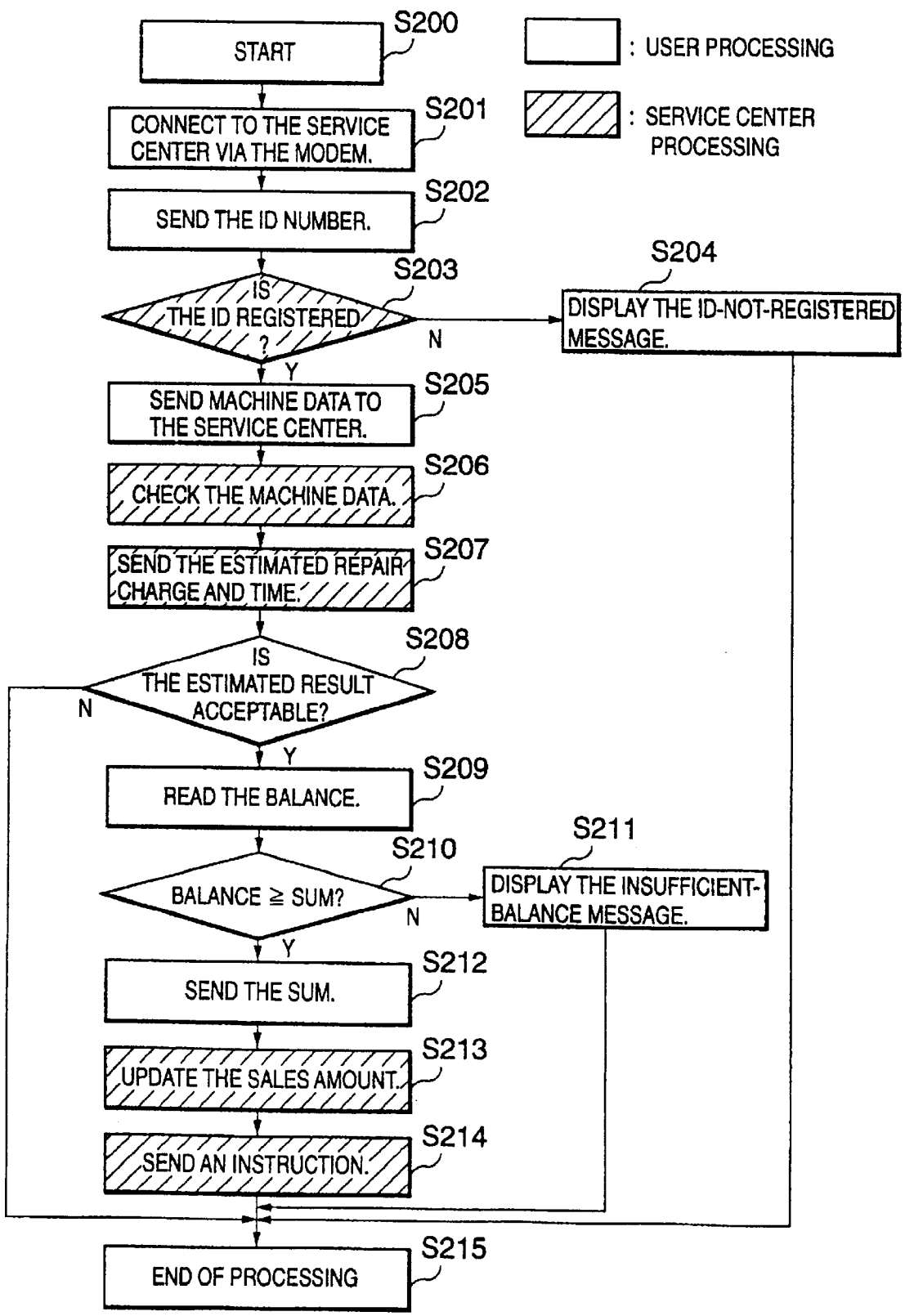

FIG. 7 is a flowchart showing another example of operation in which a personal computer accesses a service center.

Figure 8:
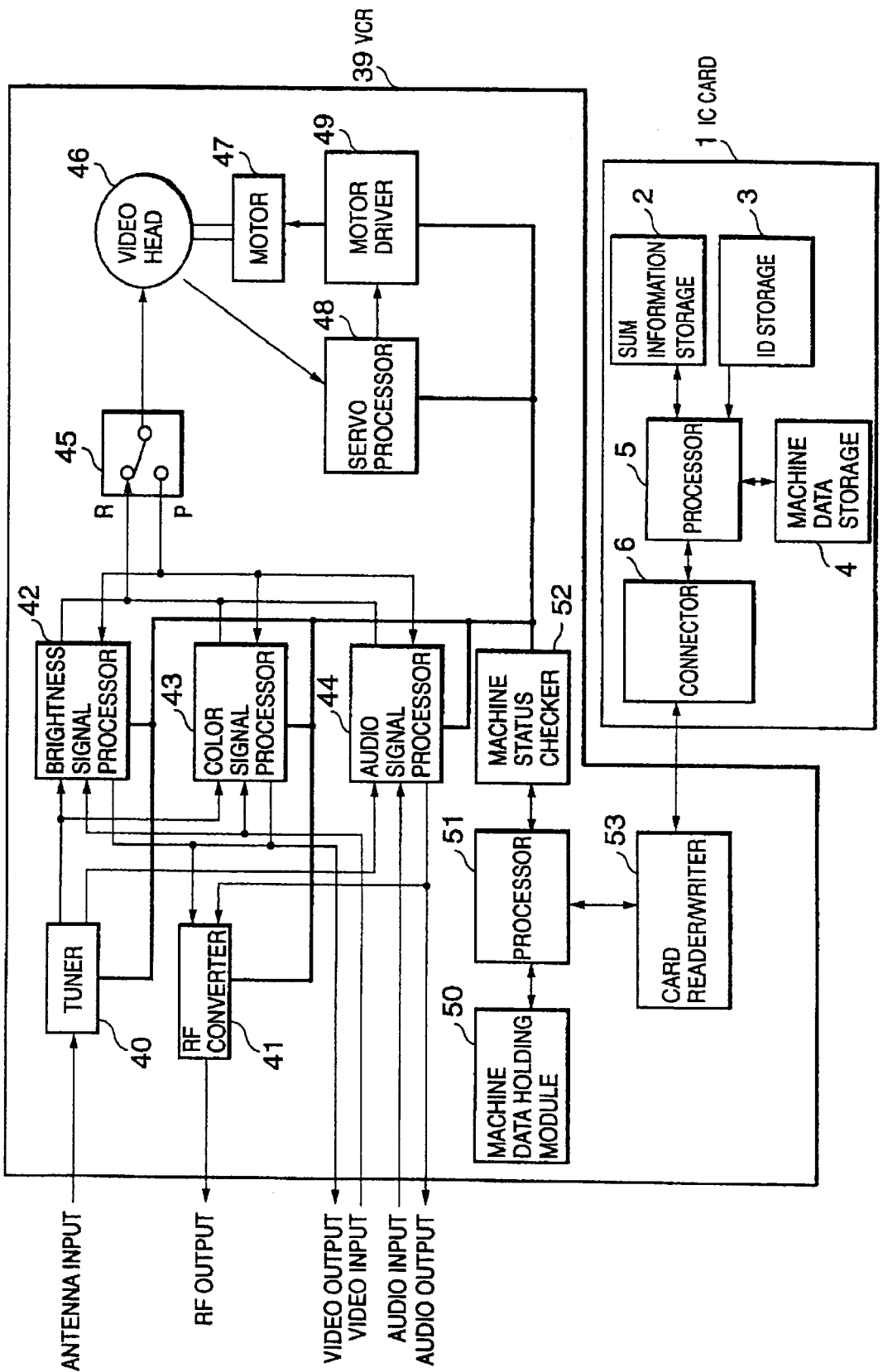

FIG. 8 a diagram showing an embodiment in which the present invention is applied to the error diagnosis of a VCR.

Figure 9:
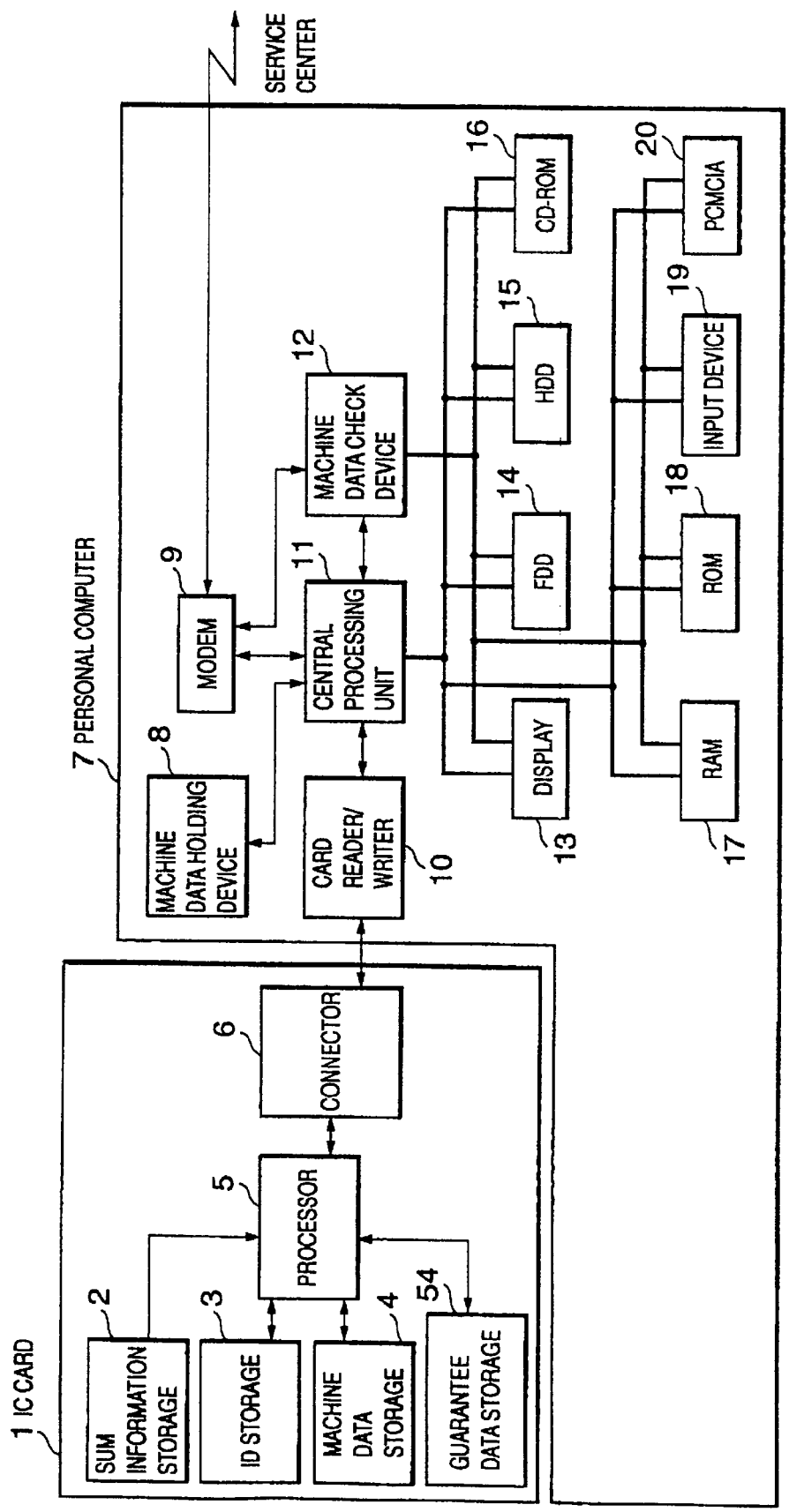

FIG. 9 is a diagram showing a third embodiment in which the present invention is applied to the error diagnosis of a personal computer.

FIG. 10 shows an example of data stored in guarantee data storage.

Figure 11:
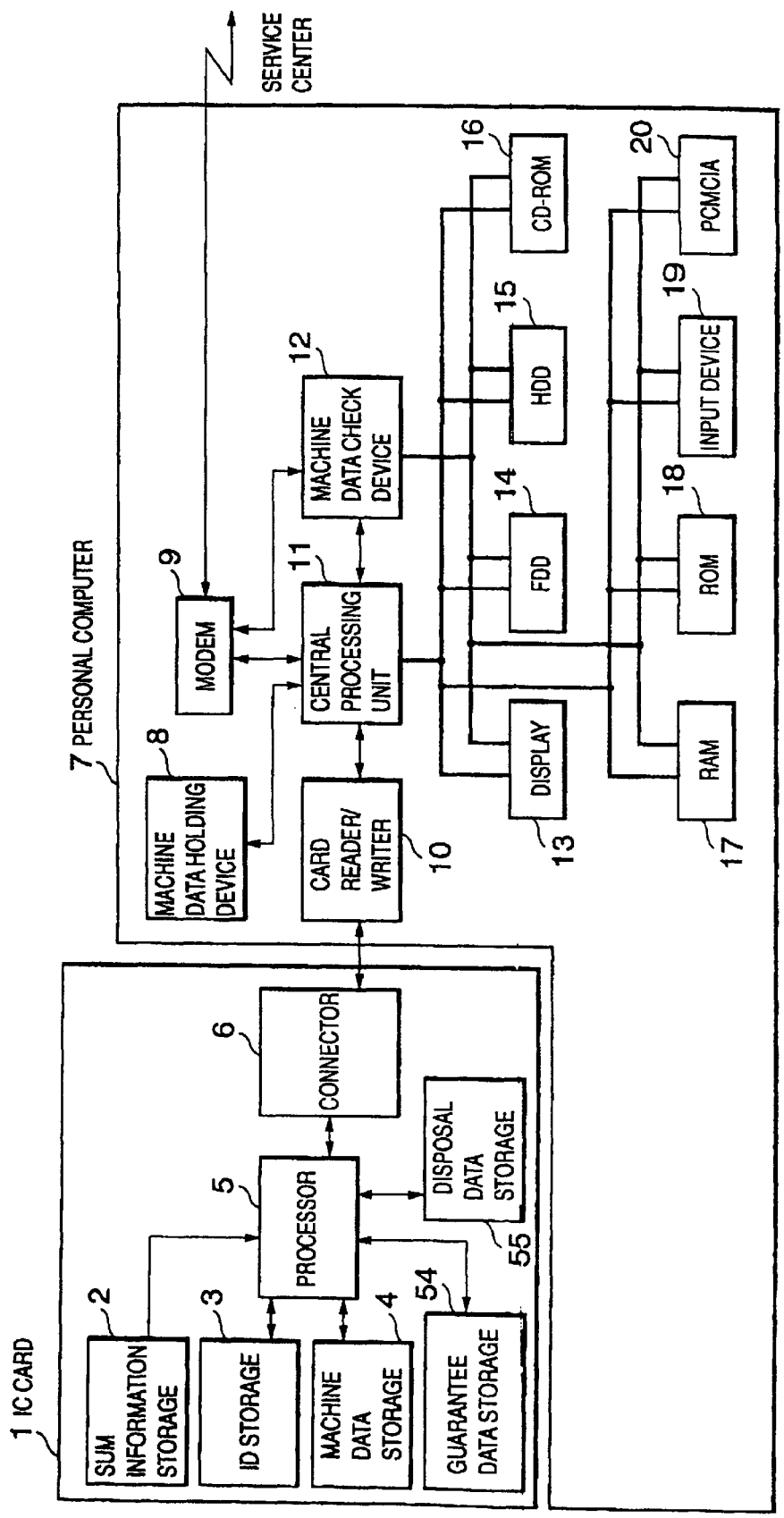

FIG. 11 is a diagram showing a fourth embodiment in which the present invention is applied to the error diagnosis of a personal computer.

Figure 12:
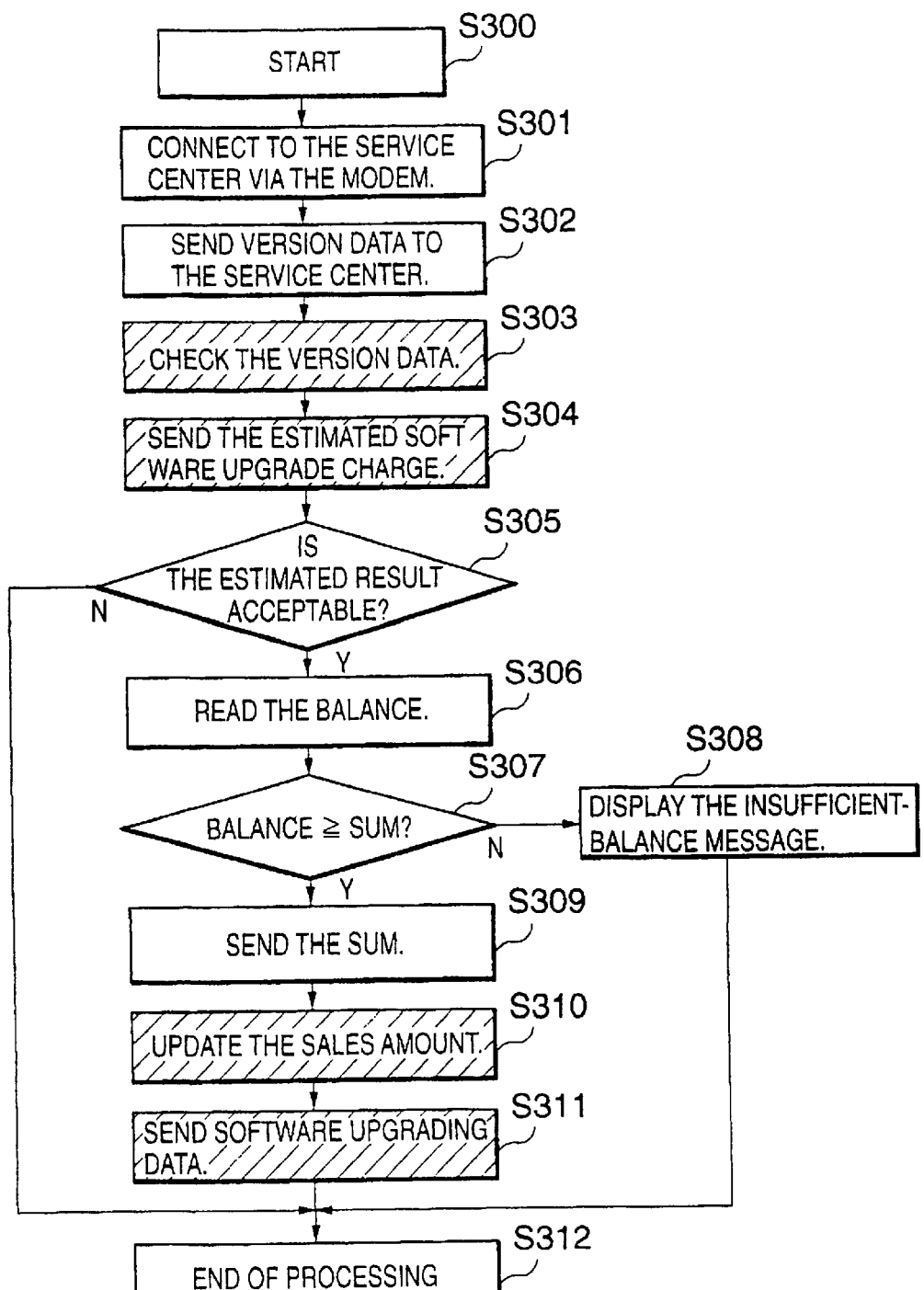

FIG. 12 is a flowchart showing an example of how software upgrading service is performed.

DETAILED DESCRIPTION OF PREFERRED EMBODIMENTS

The following describe some embodiments of the present invention with reference to the attached drawings.

Figure 1:
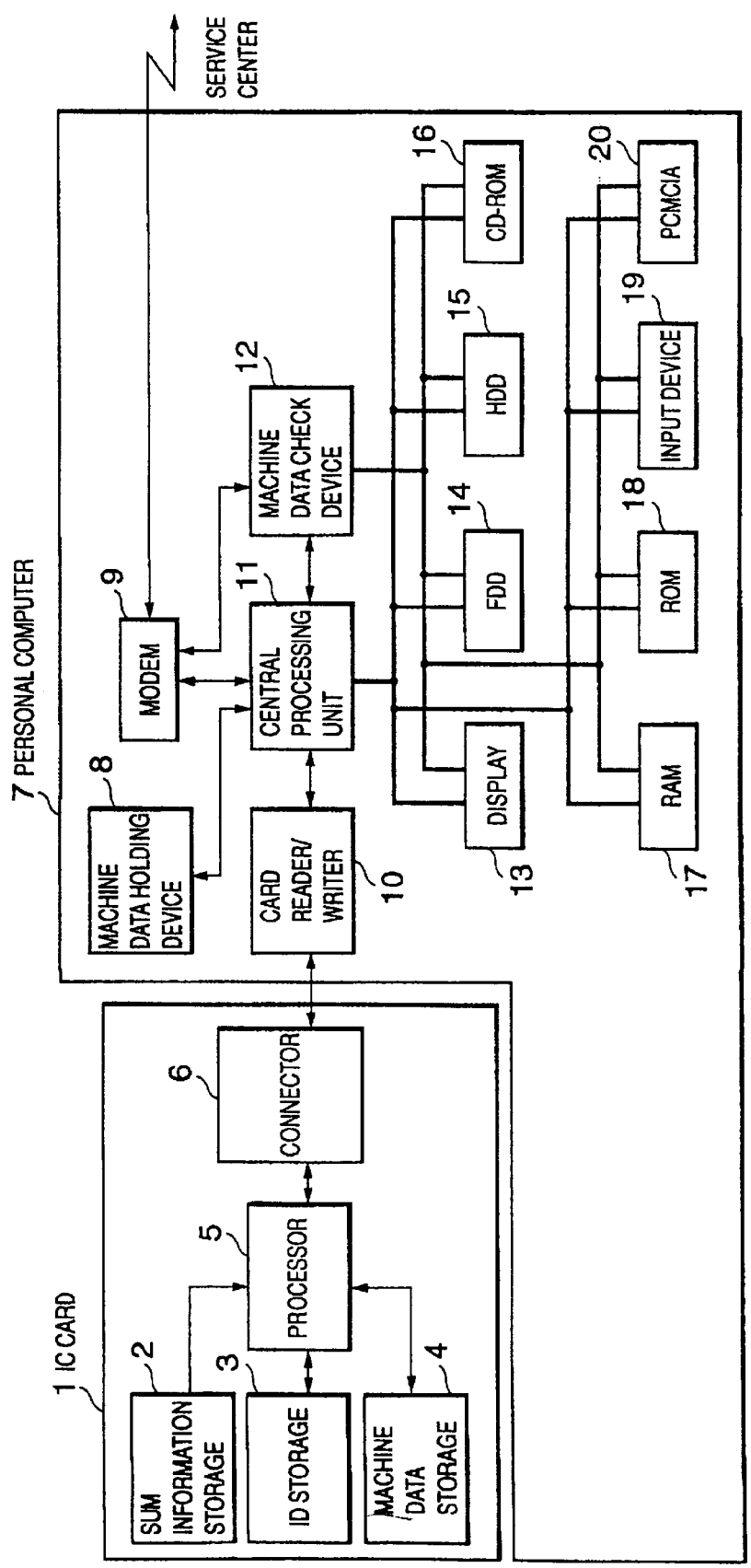
FIG. 1 is a diagram showing a first embodiment in which the present invention is applied to the error diagnosis of a personal computer.

FIG. 1 is a diagram showing a system, one of the embodiments of the present invention, which diagnoses the status of the machines (component devices) of a personal computer. As shown in FIG. 1, this system includes an IC card 1 and a personal computer (hereafter called a PC) 7.

The IC card 1 comprises sum (cash value) information storage 2, ID storage 3, machine data storage 4, a processor 5, and a connector 6. The processor 5 is connected to the sum information storage 2, ID storage 3, machine data storage 4, and connector 6.

The PC 7 comprises a machine data holding device 8, a modem 9, an IC card reader/writer 10, a central processing unit 11, a machine data check device 12, a display 13, a floppy disk drive (hereafter called an FDD) 14, a hard disk drive (hereafter called an HDD) 15, a CD-ROM drive (hereafter called a CD-ROM) 16, a RAM 17, a ROM 18, an input device 19, and a PCMCIA card interface (hereafter called PCMCIA) 20. The central processing unit 11 is connected to the machine data holding device 8, modem 9, IC card reader/writer 10, machine data check device 12, display 13, FDD 14, HDD 15, CD-ROM 16, RAM 17, ROM 18, input device 19, and PCMCIA 20. The machine data check device 12 is connected to the modem 9, central processing unit 11, display 13, FDD 14, HDD 15, CD-ROM 16, RAM 17, ROM 18, input device 19, and PCMCIA 20. As shown in FIG. 1, the central processing unit 11 and the machine data check device 12 are connected to the display 13, FDD 14, HDD 15, CD-ROM 16, RAM 17, ROM 18, input device 19, and PCMCIA 20 using one bus. However, they may be connected using separate signal lines.

When the user turns off the power of the PC 7, the machine data check device 12 reads the status of each machine and stores the machine status data in the machine data holding device 8. The machine data check device 12 may be designed so that it reads the status of each machine not only at the time of power-off but at a regular interval to store the status data into the machine data holding device 8. This keeps the machine data in the machine data holding device 8 up to date.

When the IC card 1 is connected to the PC 7 in this situation, the central processing unit 11 is informed of the connection of the IC card. Upon detecting the connection, the central processing unit 11 reads machine data from the machine data holding device 8 of the PC 7 and, via the card reader/writer 10, writes the machine data into the machine data storage 4 in the IC card 1. The system may also be designed so that, when the IC card 1 is already connected to the PC 7, machine data is stored not only into the machine data holding device 8 but also into the machine data storage 4 in the IC card 1.

FIG. 2 shows an example of data stored in the machine data storage 4 in the IC card 1. As shown in FIG. 2, the machine data storage 4 contains the name, machine specifications, model number, product number, and status (usage period, error status, error code, etc.) of each machine (component device) of the PC 7. The name, specifications, model number, and product number are written into the machine data storage 4 in the IC card, for example, by a PC store. When a user buys a PC, the IC card containing such data comes with the PC. The "machine status" field in the machine data storage 4 holds the machine data on each machine read by the machine data check device 12.

Figure 3:
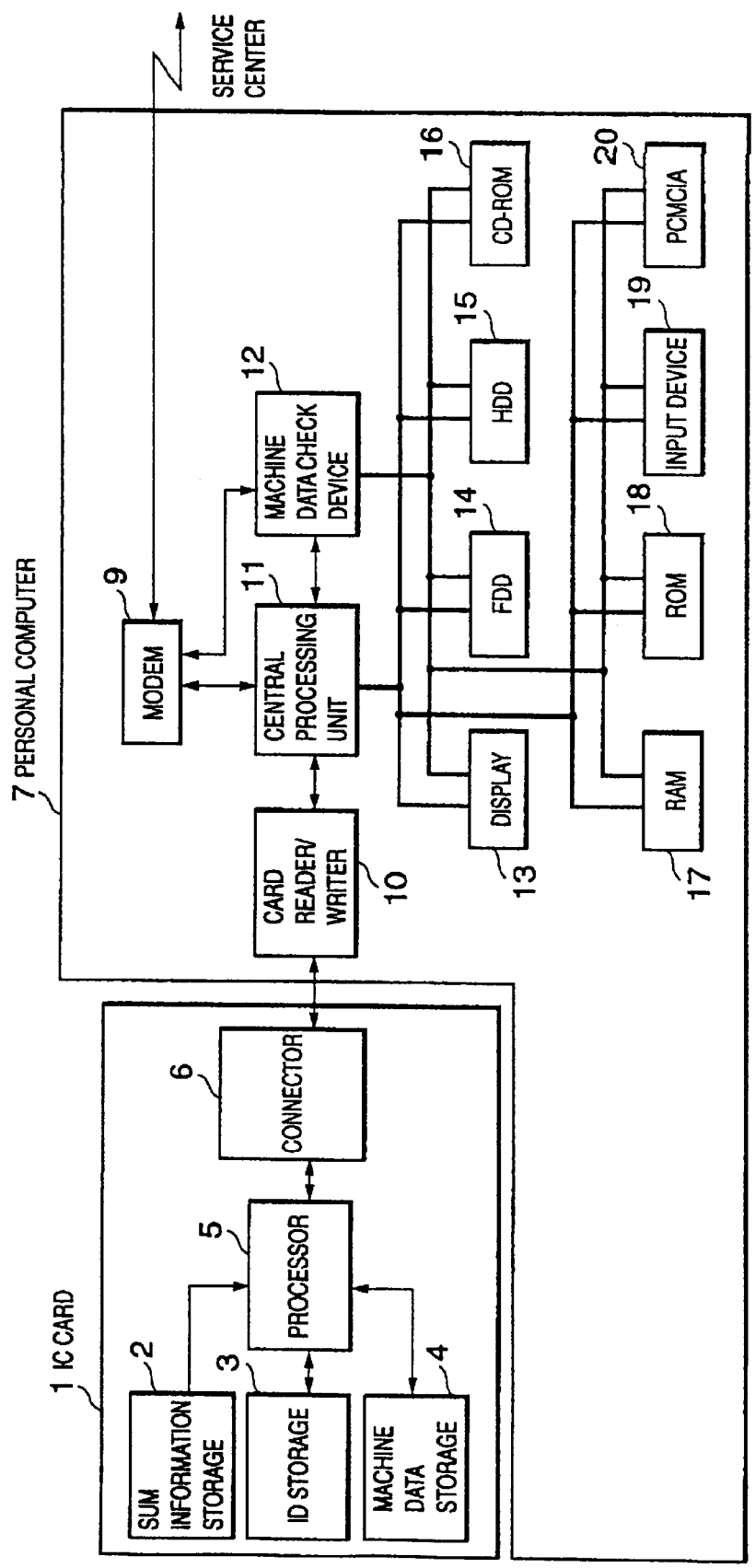
FIG. 3 is a diagram showing a second embodiment in which the present invention is applied to the error diagnosis of a personal computer.

FIG. 3 shows an embodiment in which a PC 7 does not have a machine data holding device 8. The PC 7 shown in FIG. 3 is similar to the PC 7 shown in FIG. 1 except that the former does not have the machine data holding device 8. In this embodiment, an IC card 1 is constantly connected to the PC 7, and machine data read by a machine data check device 12 is stored in machine data storage 4 in the IC card 1.

Although the central processing unit 11 and the machine data check device 12 are separate in the above embodiments, these two may be combined into one.

Figure 4:
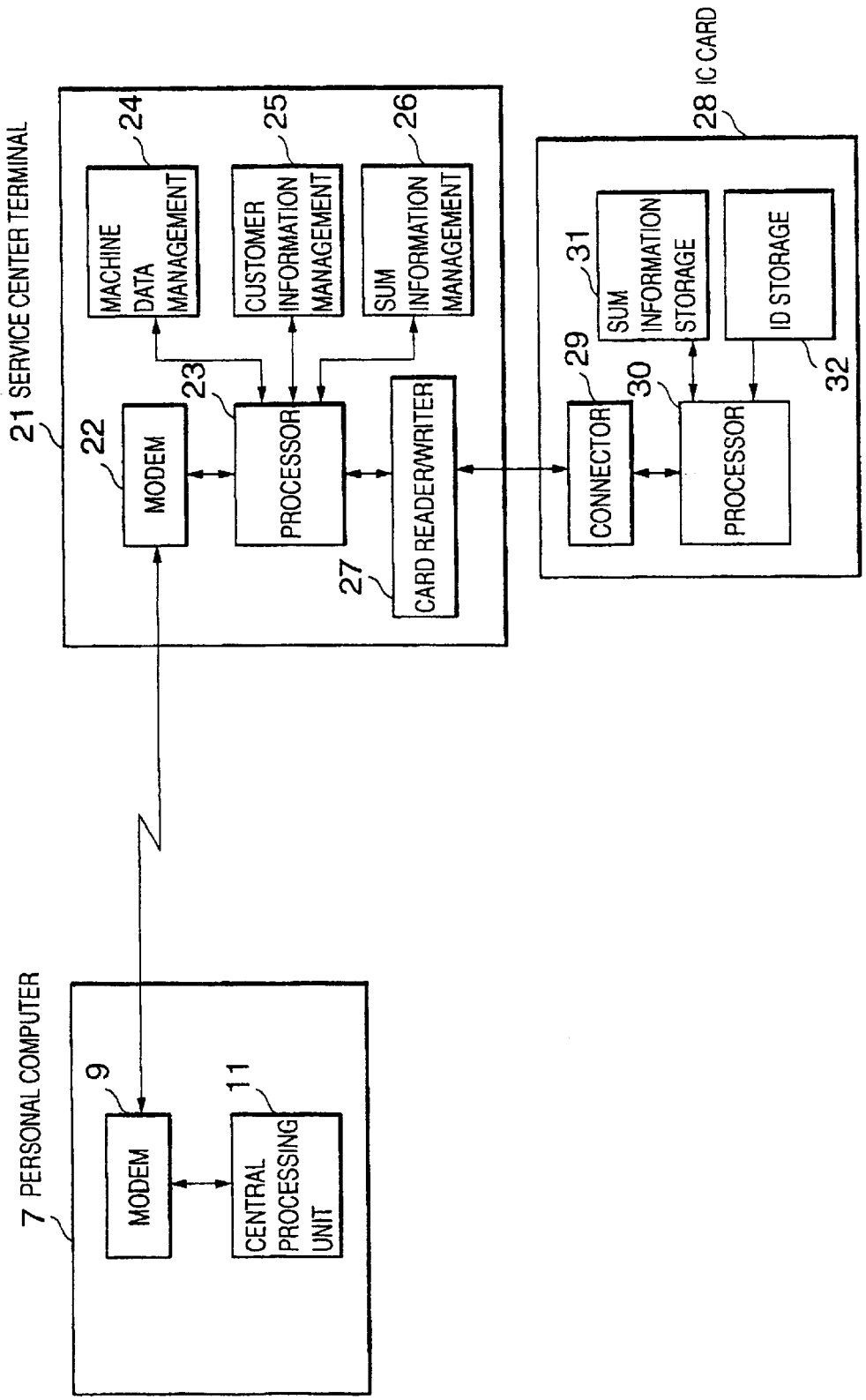
FIG. 4 is a diagram showing how data is transferred between a personal computer and a service center.

FIG. 4 shows an example in which machine data is sent from the PC 7 to a service center terminal 21 when the PC fails. As shown in FIG. 4, the service center terminal 21 comprises a modem 22, a processor 23, a machine data management unit 24, a customer information management unit 25, a sum information management unit 26, and a card reader/writer 27. An IC card 28 is also connected to the service center terminal 21. In this embodiment, sum information having monetary values is transferred between IC cards. The IC card 28 comprises a connector 29, a processor 30, sum information storage 31, and ID storage 32.

When the PC 7 is malfunctioning, the user of the PC 7 accesses the service center terminal 21 installed in the service center, via the modem 9. When a connection is established between the modems, the PC 7 sends machine data to the service center via the modem 9. Upon receiving the machine data, the service center terminal 21 compares it with machine data stored in the machine data management unit 24 to identify the location and the cause of the error generated in the personal computer. Based on the comparison result, the service center terminal 21 estimates the repair charges and the required repair time, and sends the estimated result to the modem 9 at the user site over a telephone line. The estimated result sent from the service center over the telephone line is received by the modem 9 at the user site and displayed on the display connected to the PC 7. The user checks the estimated result and determines whether to ask for repair.

Depending upon the error status of the PC 7, it may be impossible to access the service center via the modem 9 in the PC 7. In that case, machine data is sent to the service center with the use of a telephone line terminal and an IC card containing therein the machine data.

Figure 5:
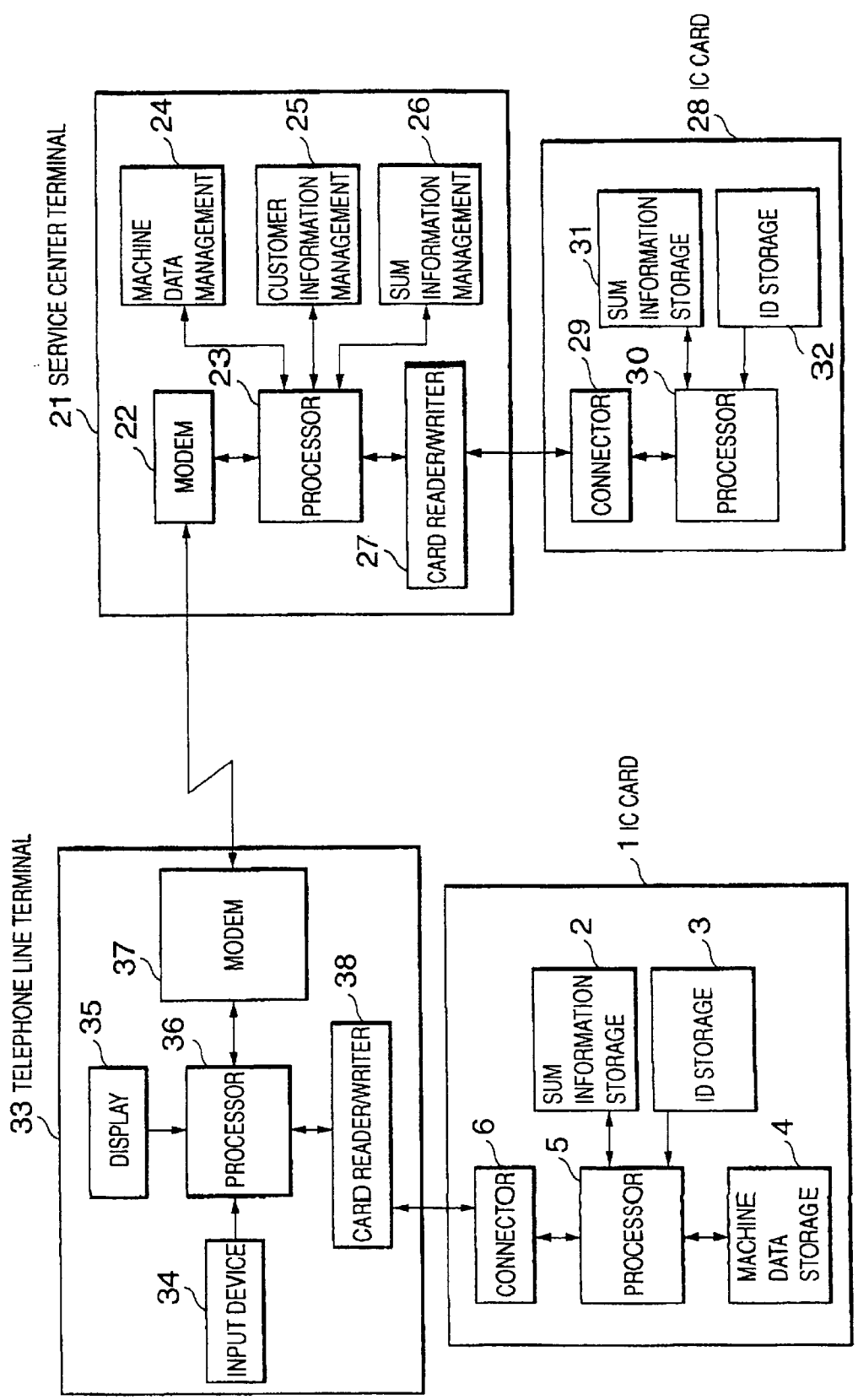
FIG. 5 is a diagram showing how data is transferred between a telephone line terminal and a service center.

FIG. 5 shows an example in which a telephone line terminal is used. As shown in FIG. 5, a telephone line terminal 33 comprises an input device 34, a display 35, a processor 36, a modem 37, and an IC card reader/writer 38. The processor 36 is connected to the input device 34, display 35, modem 37, and the card reader/writer 38.

When the IC card 1 is inserted into the telephone line terminal 33, machine data stored in the machine data storage 4 in the IC card 1 is read by the telephone line terminal 33 and is sent via the telephone line to the service center terminal 21 installed in the service center. The telephone line terminal 33 can be implemented by adding the machine data sending function, which sends machine data stored in the IC card, to a telephone capable of sending electronic money or to a telephone adapter connected to a standard telephone.

Figure 6:
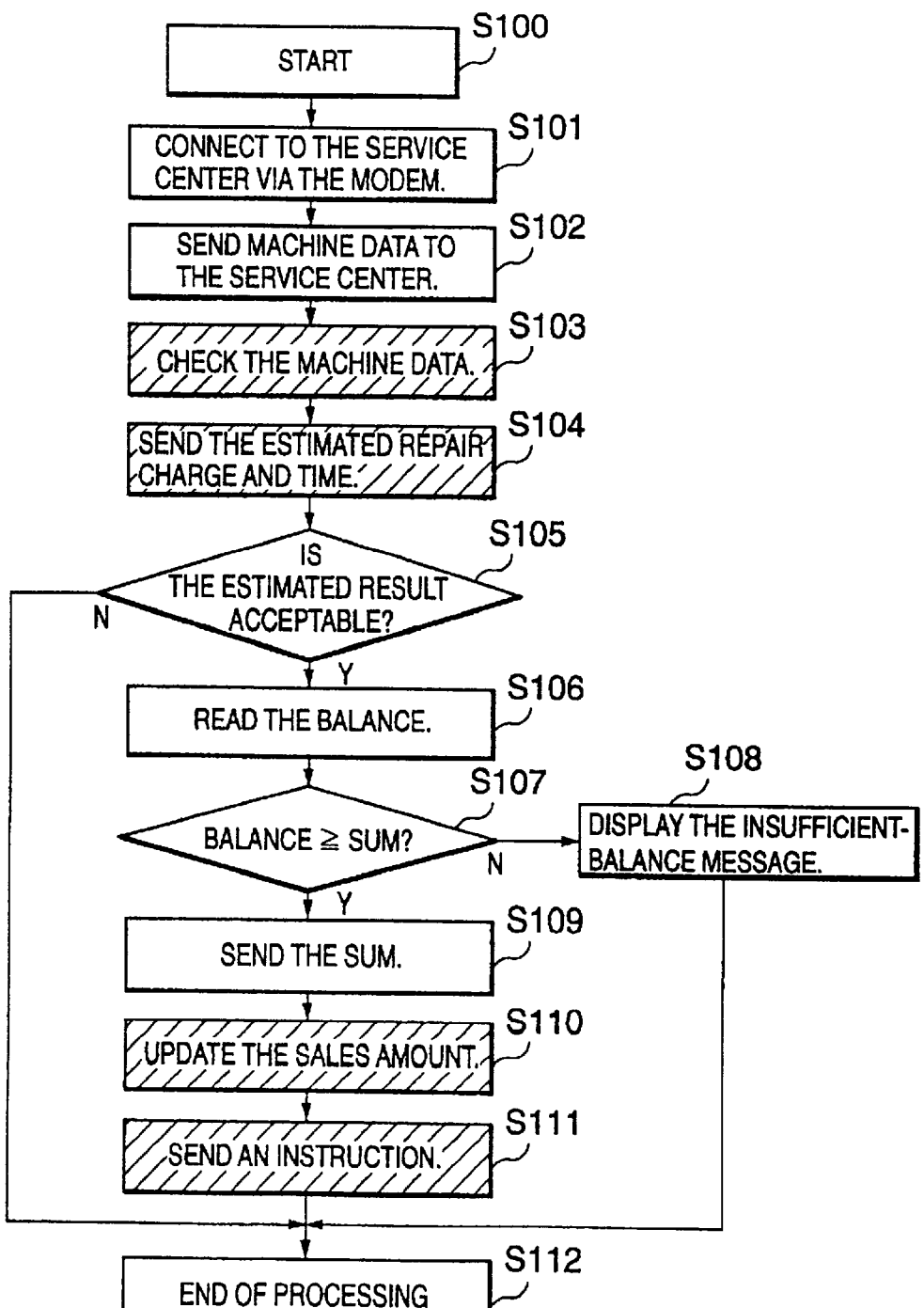

FIG. 6 is a flowchart showing processing performed at a PC user side and the service center when the user's PC fails and the user receives the repair charges estimate service. As shown in FIG. 6, when the PC fails, the user first accesses the service center terminal 21 installed in the service center via the modem 9 in the PC 7 (or the modem 37 in the telephone line terminal 33) (S101). When a connection is established between the two modems, machine data stored in the machine data storage 4 in the IC card 1 is sent to the service center via the modem 9 (or modem 37 ) (S102). Upon receiving the machine data, the service center terminal 21 compares it with data stored in the machine data management unit 24 to identify the location and the cause of the error generated in the PC (S103). Based on the comparison result, the service center terminal 21 estimates the required repair charges and repair time, and sends the estimated result to the user over the telephone line (S104). The estimated result sent from the service center is displayed on the display of the PC 7 or the telephone line terminal 33. The user checks the estimated result and determines whether to ask for repair (S105). If the estimated result is acceptable, the user requests repair of the PC.

In this embodiment, the user who requests repair of the PC is able to immediately pay the estimated charge fully or partially. When the user requests to pay, the balance (sum information) stored in the IC card is read (S106) and is compared with the required sum (S107) to check if it is possible to pay the sum with the IC card. If the balance is equal to or larger than the sum, the specified sum is sent to the service center and is stored in the sum information storage 31 in the IC card 28 connected to the service center terminal 21 (S109). At the same time, the sales data stored in the sum information management unit 26 in the service center terminal 21 is updated (s110).

Then, a repair instruction is sent from the service center to the user (S111) and the processing ends (S112).

On the other hand, if the balance is smaller than the sum, a message indicating the insufficient-balance appears on the user's display (S108) and processing ends (S112).

As described above, the system in this embodiment sends machine data indicating the PC status to the service center over the telephone line. Therefore, when the PC fails, the system eliminates the need for the user to send the PC unit to the electrical appliance store or manufacturer's service center, thus saving the efforts and time required to estimate the repair charges.

FIG. 7 is a flowchart showing another embodiment of this invention. This flowchart is also composed of the steps performed at the user side and the service center when the user's PC fails and the user asks the service center to estimate the repair charge. This flowchart differs from the flowchart show in FIG. 6 in that, before machine data is sent to the service center, the ID number stored in the IC card is sent to allow the service center to check if the requesting user is a valid user.

As shown in FIG. 7, when the PC fails, the user first accesses the service center terminal 21 installed in the service center via the modem 9 in the PC 7 (or the modem 37 in the telephone line terminal 33) (S201). When a connection is established between the modems, the modem 9 (or the modem 37) sends the ID number stored in the ID storage 3 of the IC card 1 to the service center (S202). Upon receiving the ID number, the service center terminal checks if the received ID number is registered (S203). If the ID number is registered, the service center sends information indicating that the user may proceed with the processing. In this case, the steps S205 - S211 are preformed. Steps 205 to S214 are the same as steps S102 - S111 in FIG. 6.

On the other hand, if the ID number is not registered, the service center sends information indicating that it cannot proceed with the processing. Upon receiving the information, the system at the user site displays a message on the display indicating that the ID number is not registered (S204) and ends processing (S215).

By performing the above processing, this embodiment allows only the registered users to receive the service.

In the above description, the present invention is applied to personal computers. The present invention also finds applications in household electrical appliances such as a TV or a VCR as described below.

FIG. 8 shows a videocassette recorder (VCR) according to the present invention. As shown in FIG. 8, a VCR 39 comprises a tuner 40, an RF converter 41, a brightness signal processor 42, a color signal processor 43, an audio signal processor 44, a switch 45, a video head 46, a motor 47, a servo processor 48, a motor driver 49, a machine data holding unit 50, a processor 51, a machine status checker 52, and an IC card reader/writer 53.

When data is recorded, video signals and audio signals from an antenna input terminal, a video input terminal, and an audio input terminal are modulated by the brightness signal processor 42, color signal processor 43, and audio signal processor 44 and are combined. The combined signals are sent to the video head 46 via the switch 45 for recording by the video head 46 on magnetic tape.

On the other hand, when data is played back, the signal read by the video head 46 is frequency-separated, modulated by the brightness signal processor 42, color signal processor 43, and audio signal processor 44, and then output from an RF output terminal, a video output terminal, and an audio output terminal. The video head 46 is turned by the motor 47. The video head 46 and motor 47 are controlled by the servo processor 48 and the motor driver 49.

As shown in FIG. 8, the tuner 40, RF converter 41, brightness signal processor 42, color signal processor 43, audio signal processor 44, servo processor 48, and motor driver 49 are connected to the machine status checker 52. The machine status checker 52 reads operation status data on each machine (component unit) at a predetermined timing and stores the data in the machine data holding unit 50 as machine data. In this situation, inserting the IC card 1 into the VCR 39 causes machine data to be copied from the machine data holding unit 50 to the machine data storage 4 in the IC card.

After the machine data has been read from the VCR 39 using the IC card 1 as described above, the IC card 1 is connected to the telephone line terminal 33 such as the one shown in FIG. 5. The telephone line terminal 33 reads machine data from the IC card 1 and sends it to the service center over the telephone line. Based on the received machine data, the service center estimates the required repair charge and the repair time, and sends the estimated result information to the telephone line terminal 33 on the user site via the telephone line. Upon receiving the information from the service center terminal 21, the telephone line terminal 33 displays it on the display 35.

In the embodiment shown in FIG. 8, the processor 51 and the machine status checker 52 are separate. However, the processor 51 may carry out all processing.

As described above, the status of the components of a failing household electrical appliance is read, stored in the IC card, and sent to the service center over the telephone line. Therefore, the need for the user to send the failing household electrical appliance to the manufacturer's service center is eliminated, thus significantly saving the efforts and time required to estimate the repair charges and the required repair time.

The present invention may also be applied to products other than PCs and household electrical appliances. For example, the IC card, if installed on a car, is able to get status data on the parts of the car. When the car needs repairing, status data on the parts of the car stored in the IC card can be used for identifying the cause of a failure or estimating the repair charge. In addition, the repair charge may be paid using sum information stored in the IC card.

Next, another embodiment in which guarantee (warranty) data is managed with the use of an IC card is described. In this embodiment, guarantee data which has been supplied on paper is stored in the IC card.

FIG. 9 shows an IC card 1 having guarantee data storage 54 and a PC 7 to which the IC card 1 is connected. The PC 7 is similar to the one shown in FIG. 1. The guarantee data storage 54 in the IC card 1 contains data corresponding to that which has been supplied on a written guarantee.

FIG. 10 shows an example of data stored in the guarantee data storage 54. As shown in FIG. 10, the guarantee data storage 54 stores the name of a component, supplier name, purchase date, guarantee period, guarantee number, repair history data, and so forth, for each component of the PC 7. This data is written into the IC card, for example, by the PC store when the PC is purchased or by the service center when the PC is repaired.

When machine data is sent to the service center (for example, in S102 of FIG. 6), the guarantee data stored in the guarantee data storage 54 is also sent to the service center. The service center terminal 21 compares the received guarantee data with the data stored in the customer information management unit 25 to check the guarantee period and so forth.

Thus, the guarantee data storage 54, if provided in the IC card, allows guarantee data to be sent over the communication line, making it possible to check whether the guarantee is still valid or whether the repair service should be provided free of charge.

Next, still another embodiment will be described. Recently, various regulations are established concerning the disposal of household electrical appliances in order to protect the environment. For example, electrical appliances must be classified by material for re-cycling before disposal or appropriate disposal methods must be used. In this embodiment, an IC card stores information on the material and the disposal method of each part of an electrical appliance for effective disposal and re-cycling.

FIG. 11 shows an IC card 1 having disposal data storage 55 and the PC 7 to which the IC card 1 is connected. The disposal data storage 55 contains disposal data describing the materials and disposal method of each part of the PC. This data is previously written by the PC manufacturer or vendor. When the PC user wants to dispose of the PC, the user sends the disposal data to the municipal office or a disposal services company using the modem 9 in the PC 7 (or the modem in the telephone line terminal). Upon receiving the disposal data, the municipal office or the disposal services company calculates the disposal charge based on the received disposal data and sends back the calculated disposal charge and method (e.g. collection date) to the user. If the disposal charge is acceptable, the user pays the charge using sum information stored in the IC card. When the municipal office or the disposal services company acknowledges the payment, it sends disposal permission data which certifies that the appropriate disposal charge was paid to the user. The disposal permission data sent to the user is stored in the disposal data storage 55. When a junk dealer visits the user at a later date to collect the PC, the user gives the IC card 1 containing the disposal permission data to the junk dealer. Then, the junk dealer checks using a portable terminal, that the IC card 1 contains the disposal permission data and then collects the PC. A sequence of these processes makes disposal and collection more efficient. In addition, the disposal services company which gets the information about the materials of the parts and the disposal method in advance can perform disposal and recycling more smoothly.

Software upgrade service, another embodiment of the present invention, is described below. In this embodiment, the machine data storage 4 stores information on the software contained in the machine. This information includes software version information and user registration numbers. The software contained in the machine include the programs stored in the EEPROM of the machine and the programs installed on the HDD. Information such as software version information and user registration numbers are written, for example, by the software development company or software vendor.

Version information stored in the IC card, which is sent to the service center via the communication line, is useful in calculating program upgrading charges or in identifying data necessary for software upgrading. A user registration number or ID number stored in the IC card, which is sent to the service center via the communication line, allows the user to be identified as a valid user. Identifying the user using data stored in the IC card ensures security. Sum information stored in the IC card allows the charge to be paid immediately, thus making the payment of the charge for upgrading the software easier.

FIG. 12 is a flowchart showing user-side processing and service center processing when the software upgrade service is provided. As shown in FIG. 12, the user who wishes to upgrade the software accesses the service center using the modem (S301). When communication with the service center is established, the software version information is sent from the user side (S302). The service center checks the received version information (S303), calculates the charge required for software upgrading, and returns the result to the user (S304).

The user determines whether to upgrade the software based on the estimated result displayed on the display (S305). When the user decides to upgrade the software, the balance stored in the IC card is read (S306) to check if the user is able to pay the upgrading charge. The balance is compared with the required sum (S307). If it is found that the user is able to pay the charge as the result of comparison (S307, Y), the required sum information is sent to the service center and is stored in the sum information storage 31 in the IC card 28 of the service center (S309). At the same time, the sales data stored in the sum information management unit 26 of the service center is updated (S310). After checking that the required sum is paid, the service center sends software upgrading data to the user (S311).

On the other hand, if the balance is smaller than the sum (S307, N), a message indicating the insufficient-balance appears on the user's display (S308) and processing ends.

As described above, this embodiment enables the programs stored in the machine's built-in ROM or the software products installed in the PC to be upgraded easily.

Recently, as PC operations or machine setup procedures becomes more complicated, PCs are getting more and more difficult to use, especially for beginners. To cope with this problem, some software vendors provide paid user support services over the telephone. In such a case, if information stored in the PC or IC card, such as software version information or user registration numbers, is sent to the service center, the service center can determine, based on the received information, the service best suited for the user and give him appropriate advice efficiently. When the service center provides the user with this type of service, the charge for the service may be paid immediately using the sum information stored in the IC card 1.

The present invention may also be applied to a home video game system. For example, with the progress status data or the scores stored in the IC card, a player accesses the service center periodically to determine a ranking among the game participants or the winner of the game. In this case, game fees may also be paid using the IC card.

While the preferred forms of the present invention have been described, it is to be understood that the present invention is not limited to those described above. For example, although data is sent to, or received from, the service center over a telephone line in the above embodiments, the communication method of the present invention is not limited to the telephone line. Any type of wire or wireless communication method capable of sending and receiving data may be used.

The entire disclosure of Japanese Patent Application No. 9-150653 filed on Jun. 9, 1997 including specification, claims, drawings, and summary is incorporated herein by reference in its entirety.

What is claimed is:

1. A device data acquisition system, comprising:
a device having a device check circuit which checks a status of said device, a first communication circuit which transmits said status of the device checked by said device check circuit, and a display;
a service center terminal having a second communication circuit which receives said status of the device transmitted by said first communication circuit, and a processor which checks said status of the device;
wherein said second communication circuit transmits repairing information which is determined based on said status of device to said first communication circuit, and said display displays said repairing information received by said first communication circuit; and
wherein said repairing information is an estimated charge for repairing said device.

2. A device data acquisition system according to claim 1, wherein said first communication circuit transmits money information to said service center terminal, and said processor receives said money information, and said second communication circuit transmits an instruction to said device.

3. A device data acquisition system according to claim 1, wherein said service center terminal identifies an error portion of said device based on said status of device transmitted from said device, and said repairing information includes an estimated charge and time for repairing said error of device.

4. A device data acquisition system according to claim 1, further comprising:

an IC card reader/writer which writes said status of the device checked by said device check circuit into an IC card and reads said status of device stored in said IC card.

5. A device data acquisition system according to claim 4, wherein said IC card reader/writer reads guarantee data of said device stored in said IC card, and said first communication circuit transmits said guarantee data to said second communication circuit, and said processor checks said guarantee data received by said second communication circuit and checks guarantee term based on said guarantee data.

6. A device data acquisition system according to claim 1, wherein said first communication circuit transmits ID number, and said service center terminal checks whether said ID number is registered.

7. A device data acquisition system according to claim 1, wherein both said first and second communication circuits transmit data via a telephone line.

8. A device data acquisition system, comprising:
a device having a device check circuit which checks a status of said device, a first communication circuit which transmits said status of the device checked by said device check circuit, and a display;
a service center terminal having a second communication circuit which receives said status of the device transmitted by said first communication circuit, and a processor which checks said status of the device;
wherein said second communication circuit transmits repairing information which is determined based on said status of device to said first communication circuit, and said display displays said repairing information received by said first communication circuit; and
wherein said device check circuit checks warranty data of said device, and said first communication circuit transmits said warranty data to said second communication circuit, and said processor checks said warranty data received by said second communication circuit and checks warranty term based on said warranty data.

9. A device data acquisition system according to claim 8, wherein said first communication circuit transmits money information to said service center terminal, and said processor receives said money information, and said second communication circuit transmits an instruction to said device.

10. A device data acquisition system according to claim 8, further comprising:

an IC card reader/writer which writes said status of the device checked by said device check circuit into an IC card and reads said status of device stored in said IC card.

11. A device data acquisition system according to claim 8, wherein said first communication circuit transmits ID number, and said service center terminal checks whether said ID number is registered.

12. A device data acquisition system according to claim 8, wherein both said first and second communication circuits transmit data via a telephone line.

13. A device used in device data acquisition system having a service center terminal, comprising:
a device check circuit which checks status of said device;
a communication circuit which transmits said status of device checked by said device check circuit to said service center terminal and receives an estimated charge information for repairing said device transmitted from said service center terminal; and a display which displays said repairing information received by said first communication circuit.

14. A device according to claim 13,
wherein said communication circuit transmits money information to said service center terminal, and said display displays an instruction transmitted from said service center terminal.

15. A device according to claim 13, further comprising:
an IC card reader/writer which writes said status of device checked by said device check circuit into an IC card and reads said status of device stored in said IC card.

16. A device according to claim 15,
wherein said communication circuit transmits an ID number stored in said IC card to said service center terminal to check that the ID number is registered.

17. A device according to claim 15,
wherein said IC card reader/writer reads guarantee data of said device stored in said IC card, and said communication circuit transmits said guarantee data to said service center terminal.

18. A device according to claim 13,
wherein said communication circuit transmits said status of device via a telephone line.

19. A device used in device data acquisition system having a service center terminal, comprising:
a device check circuit which checks status of said device;
a communication circuit which transmits said status of device checked by said device check circuit to said service center terminal and receives an estimated charge information for repairing said device transmitted from said service center terminal;
a display which displays said repairing information received by said first communication circuit; and
wherein said device check circuit checks guarantee data of said device, and said communication circuit transmits said guarantee data to said service center terminal.

20. A device according to claim 19,
wherein said communication circuit transmits money information to said service center terminal, and said display displays an instruction transmitted from said service center terminal.

21. A device according to claim 19, further comprising:
an IC card reader/writer which writes said status of device checked by said device check circuit into an IC card and reads said status of device stored in said IC card.

22. A device according to claim 19,
wherein said communication circuit transmits an ID number stored in said IC card to said service center terminal to check that the ID number is registered.

23. A device according to claim 19,
wherein said communication circuit transmits said status of device via a telephone line.

24. A service center terminal used in a device data acquisition system including a device having a device check circuit which checks a status of said device, comprising:
a communication circuit which receives said status of device transmitted by said device; and
a processor which calculates an estimated charge information for repairing said device based on said status of device,
wherein said communication circuit transmits said repairing information to said device.

25. A service center terminal according to claim 24,
wherein said communication circuit transmits an instruction to said device after said processor receives said money information transmitted from said device.

26. A service center terminal according to claim 24,
wherein said processor identifies an error portion of said device based on said status of device transmitted from said device, and calculates said repairing information including an estimated charge and time for repairing said error of said device.

27. A service center terminal according to claim 24, further comprising:
a customer information memory which stores an ID number of a customer,
wherein said processor checks that an ID number transmitted from said device is registered.

28. A service center terminal according to claim 24,
wherein said communication circuit transmits said repairing information via a telephone line.

29. A service center terminal used in a device data acquisition system including a device having a device check circuit which checks a status of said device, comprising:
a communication circuit which receives said status of device transmitted by said device;
a processor which calculates an estimated charge information for repairing said device based on said status of device,
wherein said communication circuit transmits said repairing information to said device; and
wherein said communication circuit receives warranty data of said device transmitted from said device, and said processor checks said warranty term based on said warranty data received by said communication circuit.

30. A service center terminal according to claim 29,
wherein said communication circuit transmits an instruction to said device after said processor receives said money information transmitted from said device.

31. A service center terminal according to claim 29, further comprising:
a customer information memory which stores an ID number of a customer,
wherein said processor checks that an ID number transmitted from said device is registered.

32. A service center terminal according to claim 29,
wherein said communication circuit transmits said repairing information via a telephone line.

33. A device data, acquisition system, comprising:
a device having a device data check circuit which checks a status of said device, and an IC card writer which writes said status of said device into an IC card;
a communication terminal having an IC card reader/writer which reads out said status of device stored in said IC card, a first communication circuit which transmits said status of device read out from said IC card, and a display; and
a service center terminal having a second communication circuit which receives said status of device transmitted by said first communication circuit, and a processor which checks said status of device;
wherein said second communication circuit transmits an estimated charge information for repairing said device which is determined based on said status of device to said first communication circuit, and said display displays said repairing information received by said first communication circuit.

34. A device data acquisition system according to claim 33,
wherein said first; communication circuit transmits money information stored in said IC card to said service center terminal, and said processor receives said money information, and said second communication circuit transmits an instruction to said communication terminal.

35. A device data acquisition system according to claim 33,
   wherein said service center terminal identifies an error portion of said device based on said status of device transmitted from said device, and said repairing information includes an estimated charge and time for repairing said error of said device.

36. A device data acquisition system according to claim 33,
   wherein both said first and second communication circuits transmit data via a telephone line.

37. A communication terminal device used in a data acquisition system comprising a device having a device data check circuit which checks a status of said device and an IC card writer which writes said status of said device into an IC card, and a service center terminal, comprising:
   an IC card reader/writer which reads out said status of device stored in said IC card,
   a communication circuit which transmits said status of device read out from said IC card to said service center terminal and receives an estimated charge information for repairing said device which is determined based on said status of said device and transmitted from said service center terminal; and
   a display which displays said repairing information received by said communication circuit.

38. A communication terminal device according to claim 37,
   wherein said communication circuit transmits money information stored in said IC card to said service center, and said display displays an instruction transmitted from said service center terminal.

39. A communication terminal device according to claim 37,
   wherein said communication circuits transmit information of said status of device via a telephone line.

40. A device data acquisition system, comprising:
   a device having a device check circuit which checks disposal information of said device, a first communication circuit which transmits said disposal information of device checked by said device check circuit via a telephone line, and a display;
   a service center terminal having a second communication circuit which receives said disposal information transmitted by said first communication circuit, and a processor which checks said disposal information of said device;
   wherein said second communication circuit transmits disposal charge information which is determined based on said disposal information of said device to said first communication circuit via a telephone line, and said display displays said disposal charge information received by said first communication circuit; and
   wherein said first communication circuit transmits money information to said service center terminal, and said processor receives said money information, and said second communication circuit transmits disposal permission data to said device.

41. A device data acquisition system according to claim 40,
   wherein said second communication circuit transmits disposal method information with disposal charge information.

42. A device data acquisition system according to claim 40, further comprising:
   an IC card reader/writer which reads disposal information of said device stored in said IC card and writes said disposal permission data into said IC card.

43. A service center terminal used in a device data acquisition system including a device having disposal information, comprising:
   a communication circuit which receives said disposal information transmitted by said device via a telephone line;
   a processor which calculates disposal charge information based on said disposal information,
   wherein said communication circuit transmits said disposal charge information to said device via a telephone line;
   wherein said communication circuit transmits disposal permission data to said device after said processor receives money information transmitted from said device.

44. A device data acquisition system, comprising:
   a device having a memory which stores a software program, a device data check circuit which checks version information of said program stored in said memory, a first communication circuit which transmits said version information checked by said device data check circuit, and a display; and
   a service center terminal having a second communication circuit which receives said version information transmitted by said first communication circuit, and a processor which checks said version information;
   wherein said second communication circuit transmits upgrading information for upgrading said program which is determined based on said version information to said first communication circuit, and said display displays said upgrading information received by said first communication circuit;
   an IC card reader/writer which writes said version information of said program into an IC card and reads out said version information of said program from said IC card;
   wherein said upgrading information is an estimated charge for upgrading said program.

45. A device data acquisition system according to claim 44,
   wherein said first communication circuit transmits money information to said service center terminal, and said processor receives said money information, and said second communication circuit transmits software upgrade data to said first communication circuit.

46. A device data acquisition system according to claim 44,
   wherein said first communication circuit transmits said version information via a telephone line and said second communication circuit transmits said upgrading information via a telephone line.

47. A device used in a device data acquisition system having a service center terminal, comprising:
   a memory which stores a software program;
   a device data check circuit which checks version information of said program stored in said memory;
   a communication circuit which transmits said version information checked by said device data check circuit to said service center terminal and receives upgrading information for upgrading said program transmitted from said service center terminal;

a display which displays said upgrading information received by said communication circuit;

an IC card reader/writer which writes said version information of said program into an IC card and reads out said version information of said program from said IC card;

wherein said upgrading information is an estimated charge for upgrading said program.

48. A device according to claim 47, wherein said communication circuit receives software upgrade data from said service center terminal after transmitting money information to said service center terminal.

49. A device according to claim 47, wherein said communication circuit transmits said version information via a telephone line.

50. In a service center terminal having a communication circuit used in a device data acquisition system including a device having a device check circuit which checks a status of said device, a method comprising the steps of:

transmitting said status of device information by said device and receiving said status of device information with said communication circuit;

calculating an estimated charge information for repairing said device based on said status of device information, and transmitting said repairing information to said device with said communication circuit.

51. A method according to claim 50, wherein said transmitting transmits said repairing information via a telephone line.

52. In a service center terminal having a communication circuit used in a device data acquisition system including a device having disposal information, a method comprising the steps of:

transmitting said disposal information by said device via a telephone line and receiving said disposal information with said communication circuit;

calculating disposal charge information based on said disposal information, transmitting said disposal charge information to said device via a telephone line with said communication circuit;

wherein said transmitting transmits disposal permission data to said device after said processor receives money information transmitted from said device.

53. A device data acquisition system, comprising:

a device having a device check circuit which checks a status of said device, a first communication circuit which transmits said status of the device check ed by said device check circuit, and a display;

a service center terminal having a second communication circuit which receives said status of the device transmitted by said first communication circuit, and a processor which checks said status of the device;

wherein said second communication circuit transmits repairing information which is determined based on said status of device to said first communication circuit, and said display displays said repairing information received by said first communication circuit;

wherein said repairing information is an estimated charge for repairing said device; and wherein if the first communication circuit is unable to transmit the status of the device, such information is obtained from an IC card.

* * * * *